(12) United States Patent
　　　Kirmani et al.

(10) Patent No.: US 12,658,759 B2
(45) Date of Patent: Jun. 16, 2026

(54) OPTIMIZED ELECTRIC HEADERS AND MANUFACTURING PROCESSES FOR ERGONOMIC PACK ASSEMBLY AND POTTING LEAKAGE PREVENTION

(71) Applicant: GM GLOBAL TECHNOLOGY OPERATIONS LLC, Detroit, MI (US)

(72) Inventors: Mohammad Hamza Kirmani, Troy, MI (US); Zayd Alkhadashi, Detroit, MI (US); Anthony M. Coppola, Rochester Hills, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 18/629,000

(22) Filed: Apr. 8, 2024

(65) Prior Publication Data

US 2025/0317024 A1　　Oct. 9, 2025

(51) Int. Cl.
| | |
|---|---|
| B60K 1/04 | (2019.01) |
| B60L 1/00 | (2006.01) |
| B60L 50/60 | (2019.01) |
| B60L 50/64 | (2019.01) |
| H02K 5/22 | (2006.01) |
| H02K 11/00 | (2016.01) |
| H02K 15/00 | (2006.01) |

(52) U.S. Cl.
CPC ................ *H02K 5/225* (2013.01); *B60L 1/00* (2013.01); *B60L 50/64* (2019.02); *B60L 50/66* (2019.02); *H02K 11/0094* (2013.01); *H02K 15/00* (2013.01)

(58) Field of Classification Search
CPC .... B60K 1/04; H01M 50/502; H01M 50/296; B60L 50/64; B60L 50/66; B60L 1/00
See application file for complete search history.

(56) References Cited

U.S. PATENT DOCUMENTS

| | | | | |
|---|---|---|---|---|
| 7,186,477 | B2* | 3/2007 | Lei ...................... | H01M 50/578 |
| | | | | 429/61 |
| 10,581,123 | B2* | 3/2020 | Hong .................. | H01M 50/296 |
| 11,502,364 | B2* | 11/2022 | Lim ...................... | H01M 50/20 |
| 11,728,496 | B2* | 8/2023 | Champagne .......... | H01M 8/249 |
| | | | | 180/65.31 |
| 2022/0367954 | A1* | 11/2022 | Lee ...................... | H01M 50/543 |
| 2023/0395947 | A1* | 12/2023 | Stojanovski ...... | H01M 10/0413 |

* cited by examiner

*Primary Examiner* — Marc Q Jimenez
*Assistant Examiner* — James J Triggs
(74) *Attorney, Agent, or Firm* — Quinn IP Law

(57) ABSTRACT

Presented are optimized electric header designs for ergonomic battery unit assembly and potting leakage prevention, methods for making/using such electric headers, and vehicles powered by battery packs equipped with such electric headers. An electric header assembly includes an interconnect terminal that is formed with an insulating polymer and couples to a set of terminal connectors that is electrically connected to a cluster of battery cells inside a protective housing of a battery unit. A header seal, which is formed with a compressible polymer, mounts onto the interconnect terminal and compresses against the protective housing. A main header, which is formed with an insulating polymer, couples to or is integrally formed with the interconnect terminal. The main header couples to a connector plug to thereby electrically connect the terminal connectors in the interconnect terminal to an external load. The main header mounts to an external surface of the unit housing.

20 Claims, 4 Drawing Sheets

OPTIMIZED ELECTRIC HEADERS AND MANUFACTURING PROCESSES FOR ERGONOMIC PACK ASSEMBLY AND POTTING LEAKAGE PREVENTION

INTRODUCTION

The present disclosure relates generally to electrochemical devices for storing and dispensing electrical energy. More specifically, aspects of this disclosure relate to electric headers for electrically connecting traction battery packs to external loads.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively high energy density, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of current between each traction motor and the rechargeable energy storage system that supplies the requisite power for operating many hybrid-electric and full-electric powertrains. For battery-electric vehicles (BEV), the RESS is generally composed of one or more high-energy density, high-capacity traction battery packs that stack or cluster battery cells into a shared pack housing or into individual battery modules. Located on a battery side of the HV electrical system is a front-end DC-to-DC power converter that increases the voltage level of current supplied by the traction battery pack(s) to a main DC bus and a DC-to-AC power inverter module (PIM). The traction PIM is an electronic switching device for converting the DC output of the battery pack(s) into an alternating current (AC) input for powering the multi-phase traction motor(s) using, for example, pulse width modulated (PWM) control signals. A high-frequency bulk capacitor may be arranged across the positive and negative rails of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

During vehicle operation, the rechargeable battery cells housed within the traction battery pack may be electrically interconnected and actively monitored using an integrated electrical interconnect board (ICB) assembly. The ICB assembly is typically packaged inside the battery pack's protective outer housing and contains the electrical buses, sensing hardware, and power electronics for operating the pack. The ICB, in turn, electrically connects via busing brackets and HV terminal rails or wires to a set of pack headers, each of which is integrated into the pack's housing and functions as an electric terminal for connecting the pack to an external load. For instance, a crossbeam at one end of the pack's load-bearing frame may carry an Auxiliary Power Module (APM) header, an Air Conditioning Electrical Compressor (ACEC) header, and a Front Power Inverter Module (FPIM) header for respectively connecting the pack to the vehicle's resident DC-to-DC APM, in-cabin AC system, and traction PIM. During pack assembly, the pack housing may be injected with a "potting" material that, once cured, encapsulates select components and electronics inside the housing to help fluidly seal the pack while insulating the internal electrical components and providing resistance to shock and vibration.

SUMMARY

Presented below are optimized electric header designs for ergonomic pack assembly and potting leakage prevention, methods for making and methods for using such electric headers, and vehicles powered by battery packs equipped with such electric headers. By way of illustration, a disclosed electric header assembly has an optimized header design that fastens to the pack frame from outside the battery pack assembly (i.e., eliminating all interior fastening points). In an example, the electric header assembly is a bipartite construction with a terminal wire-receiving sealing layer and a main header with an integrated interconnect terminal. The sealing layer securely mounts, e.g., via overmolding, heat staking, adhesives, fasteners, or friction-fit "sleeving", onto the integral interconnect portion and rear face of the main header. The sealing layer may be an elastomer (e.g., ethylene propylene diene monomer (EPDP) rubber) or a closed-cell compressible foam that forms a water-tight interface between the main header and the pack frame. The terminal wires may be overmolded with the sealing layer or, alternatively, may be passed through complementary slots in the sealing layer. To facilitate feedthrough of the terminal wires while preventing potting leakage, the wire slots in the sealing layer may be tapered with the narrow end of each slot pointing inboard, i.e., towards the center of the pack. One end of each terminal wire is electrically mated with and physically connected to the main header, whereas the opposite end of each wire is welded to an ICB busbar. The main header is mounted onto the pack frame using fasteners, rivets, stakes, etc.; an optional adhesive layer may be used to bond and seal the header to the frame.

For bipartite constructions, the main header and interconnect terminal may be integrally formed as a single-piece unit, e.g., via injection molding, two-shot molding, 3D printing, etc., with the interconnect projecting inboard from the rear face of the header. The electric header assembly may also be a tripartite construction in which the interconnect terminal is formed separate from and then physically mounted to the main header via fasteners, mechanical lock interface, heat stakes, etc. In this instance, the sealing layer and interconnect terminal may mount onto an exterior surface of the pack frame; alternatively, the seal and interconnect may be located inside the pack housing and project through a complementary slot in the pack frame to mate the interconnect with the header. As another option, the sealing layer or header may have a threaded "male" hub portion that is directly threaded into a complementary "female" slot portion in the pack frame to secure the electric header assembly to the frame without the use of fasteners. It may be desirable that the sealing layer cover the internal face of the main header and the outer periphery of the interconnect terminal; a complementary through-hole in the center of the sealing layer receives therethrough the interconnect terminal.

To manufacture a herein-described electric header assembly, a main header may be injection molded with or overmolded onto an interconnect terminal to form a single-piece unit. For assembly designs in which the interconnect terminal is formed separately from the main header, the interconnect is formed then mechanically attached to the header, e.g., via adhesives and/or mechanical fasteners. A sealing layer is molded, sleeved, heat staked, fastened, and/or adhered onto the backside of the header and outer periphery of the interconnect. The interconnect terminal may also be connected to the main header by pushing the interconnect from the inside of the pack housing through a complementary slot in the pack frame to engage with and mechanically lock to the header. When securing the header and the interconnect to the pack frame, the sealing layer may be compressed therebetween to form a leakproof interface. A set of terminal wires inside the pack may be either overmolded with the sealing layer or fed through complementary slots in the sealing layer. It is also envisioned that the terminal wires may be molded to the main header. The electric header assembly is rigidly mounted onto an exterior surface of the pack frame by an array of fasteners passing through an outboard surface of the main header. An optional layer of adhesive may be applied to bond and seal the header assembly to the pack frame.

Attendant benefits for at least some of the disclosed concepts include RESS electric header designs and manufacturing processes that enable ergonomic pack assembly by helping to ensure line-of-sight of all header fastening points while concomitantly eliminating ergonomically unacceptable operator postures during assembly. Disclosed designs may also help to reduce header part count with a correlated reduction in system complexity, assembly time, part cost, and pack weight. In addition to reduced part counts and improved assembly ergonomics, the header design may also help to eliminate leakage of potting material from the pack and, thus, ensure a leak-proof header that protects the pack from unwanted ingress of moisture and contaminants while guarding the header's internal hardware against damage from mechanical and temperature shock.

Aspects of this disclosure are directed to optimized electric header designs for ergonomic battery unit assembly and potting leakage prevention. In an example, an electric header assembly is a bipartite or tripartite unit generally composed of an interconnect terminal, a header seal, and a main header. The interconnect terminal, which is formed, in whole or in part, from an electrically insulating polymer, mechanically couples with a set of high-voltage (HV) terminal rails, bars, or wires (collectively "connectors") that is electrically connected to a cluster of battery cells secured inside a protective housing of a battery unit. The header seal, which is formed, in whole or in part, from a compressible polymer, mounts onto the interconnect terminal and compresses against the unit housing, e.g., to fluidly seal the interface between the electric header and housing frame. The main header, which is formed, in whole or in part, from an electrically insulating polymer, is fastened, welded, bonded, integrally formed, etc. (collectively "attached") to the interconnect terminal. The main header mechanically couples with a connector plug to thereby electrically connect the terminal connectors coupled with the interconnect terminal to an external load. The main header mounts to an external surface of the battery unit's housing to help prevent the leakage of potting material from the housing. Disclosed electric header concepts are applicable to both automotive and non-automotive applications alike.

Additional aspects of this disclosure are directed to motor vehicles powered by rechargeable traction battery packs, which electrically connect to various on-vehicle systems via pack-integrated electric headers. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, aircraft, watercraft, spacecraft, e-bikes, etc. For non-automotive applications, disclosed concepts may be implemented for any logically relevant use, including for battery assemblies used in stand-alone power stations and portable power packs, photovoltaic systems, pumping equipment, wind turbine farms, machine tools, server systems, etc.

In an example, a motor vehicle includes a vehicle body with a passenger compartment, multiple road wheels attached to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable energy storage system with one or more traction battery packs is attached to the vehicle body and is operable to power the traction motor(s), in-vehicle accessories, heating, ventilation and air conditioning (HVAC) system, etc.

Continuing with the discussion of the foregoing example, each traction battery pack includes an insulated and rigid pack housing, a cluster of rechargeable battery cells secured inside the pack housing, a potting material injected into the pack housing, and one or more electric header assemblies that operatively connect the traction battery pack to the traction motor(s) and other in-vehicle loads. Each electric header assembly includes an interconnect terminal, a header seal, and a main header. The interconnect terminal is formed with an electrically insulating polymer and mechanically couples with a set of HV terminal wires that is electrically connected to the rechargeable battery cells. The header seal, which is formed with a compressible polymer, is mounted onto the interconnect terminal and compressed against the pack housing to thereby seal the main header to the pack housing. The main header, which is formed with an electrically insulating polymer, is attached to the interconnect terminal and coupled with a connector plug that is electrically connected to the traction motor(s), HVAC system, in-vehicle accessories, etc. By mating the connector plug with the main header, the connector plug electrically connects with the HV terminal wires coupled with the interconnect terminal. The main header is mounted to an external surface of the pack housing to help prevent a potting material contained therein from leaking out of the pack.

Further aspects of this disclosure are directed to manufacturing systems, workflow processes, and control logic for making or for using any of the herein described electric headers, battery packs, and/or motor vehicles. In an example, a method is presented for manufacturing an electric header assembly for a battery unit having a unit housing with multiple battery cells secured in the unit housing. This representative method includes, in any order and in any combination with any of the above and below disclosed options and features: forming, with a first insulating polymer, an interconnect terminal configured to couple with a set of terminal connectors that is electrically connected to the battery cells; forming, with a compressible polymer, a header seal configured to compress against the unit housing; forming, with a second insulating polymer, a main header configured to couple with a connector plug to thereby electrically connect the terminal connectors coupled with the interconnect terminal to an external load; attaching the main header to the interconnect terminal; mounting the header seal onto the interconnect terminal; and mounting the main header to an external surface of the unit housing.

For any of the disclosed electric headers, vehicles, and methods, the main header may include multiple header fasteners holes, each of which receives therethrough a respective fastener (e.g., self-aligning screw) to thereby mount the main header onto the external surface of the unit housing (e.g., a front crossbeam of the housing's rigid frame). In this instance, the header seal may include multiple seal fasteners holes, each of which is aligned with a respective fastener hole in the main header and receives therethrough the respective fastener of that header fastener hole to thereby mount the header seal onto the external surface of the unit housing. As another option, the header seal may compress between a pack-facing surface (e.g., a rear face) of the main header and the external surface of the unit housing. In this instance, the interconnect terminal may project from the rear face of the main header, seats within the header seal, and extends through a hole in the unit housing. It may be desirable that the electric header assembly lack a backing plate and internal fasteners that cooperatively mount the interconnect terminal and the header seal to an internal surface of the unit housing. To that end, it may be desirable that the entire electric header assembly securely mount to the unit housing from outside the housing.

For any of the disclosed electric headers, vehicles, and methods, the header seal may be integrally formed as a single-piece structure with a seal hub and a seal flange that projects transversely outward from the seal hub. In this instance, the seal hub may receive therein and surround the interconnect terminal, whereas the seal flange may sit flush against and cover the pack-facing rear face of the main header. As another option, the header seal may be integrally formed as a single-piece plate that closes one end of and projects from an outer periphery of the interconnect; the seal plate seats within a recessed pocket in a wall of the unit housing. Alternatively, the header seal may be integrally formed as a single-piece structure with a seal hub and a seal flange projecting transversely outward from the seal hub, where the seal flange sits against and covers the pack-facing rear face of the main header, and the seal hub has external threads that threadably mate with internal threads of a seal slot extending through a wall of the unit housing.

For any of the disclosed electric headers, vehicles, and methods, the terminal connectors may be HV terminal wires. In this instance, the header seal may include a set of tapered slots, each of which receives therethrough a respective one of the HV terminal wires. As another option, the interconnect terminal may include an elongated cylindrical body that contains a square array of channels, each of which receives therein and couple to a respective one of the terminal connectors. Additionally, the header seal may be formed as a single-piece structure from the compressible polymer, where the compressible polymer is either a water-tight elastomer or a closed-cell compressible foam. As another option, the insulating polymers used to form the interconnect and header are the same; in this instance, the interconnect terminal may be integrally formed with the main header as a single-piece, unitary structure.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
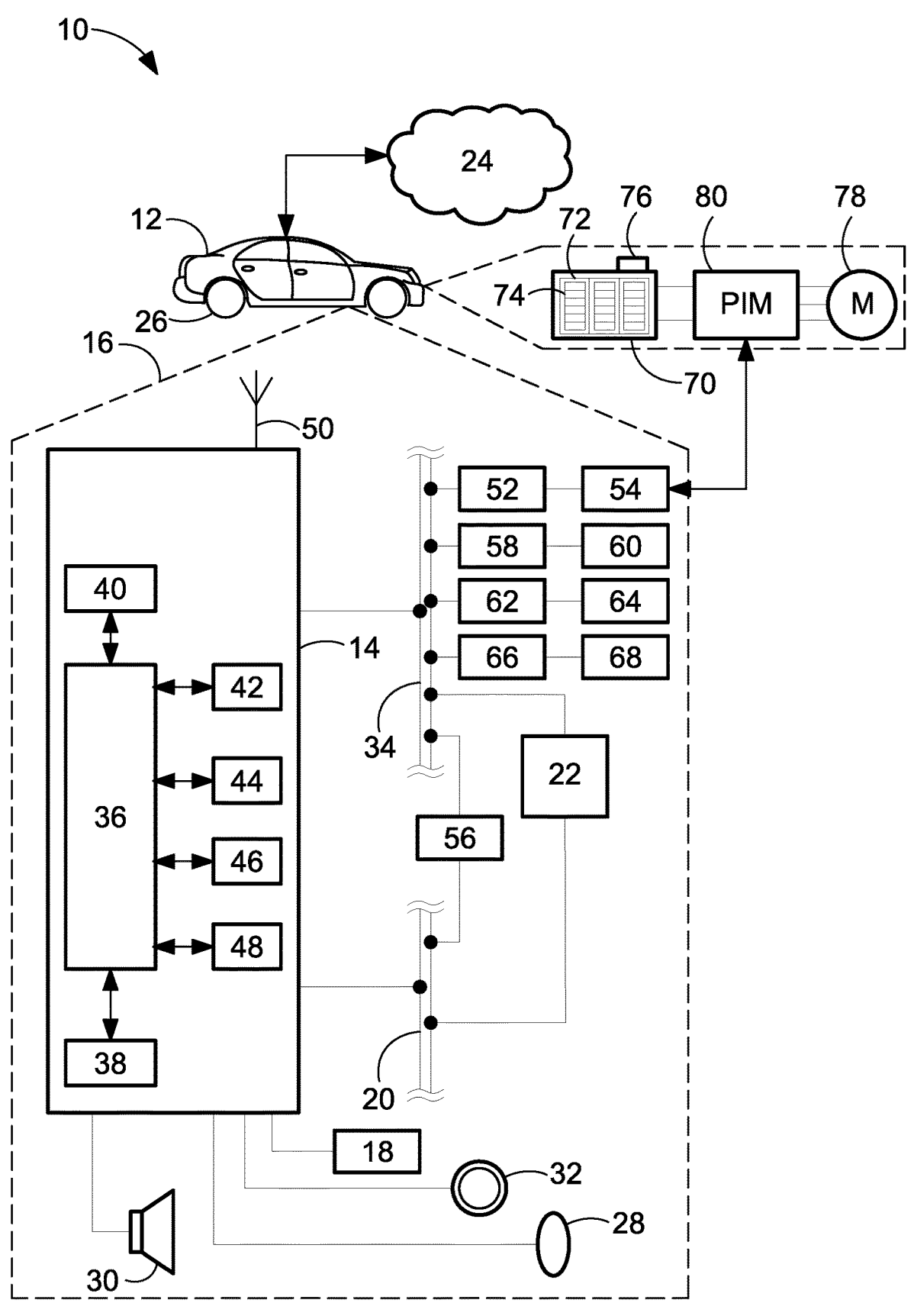
FIG. 1 is a partially schematic, side-view illustration of a representative motor vehicle powered by a Rechargeable Energy Storage System (RESS) that contains a traction battery pack with optimized electric header designs for ergonomic pack assembly and potting leakage prevention in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless explicitly disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into a cylindrical-cell traction battery pack should be appreciated as a non-limiting implementation of disclosed features. As such, it will be understood that aspects and features of this disclosure may be applied to other battery unit architectures, incorporated into any logically relevant type of motor vehicle, and utilized for both automotive and non-automotive applications alike. Moreover, only select components of the motor vehicles and battery assemblies are shown and described in detail herein. Nevertheless, the vehicles and batteries discussed below may include numerous additional and alternative features, and other available peripheral hardware, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables the vehicle hardware 16 components to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, the in-vehicle telematics unit 14 of FIG. 1 may receive and transmit signals to/from a Powertrain Control Module (PCM) 52, an Onboard Charging Module (OBCM) 54, an Electronic Battery Control Module (EBCM) 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. The telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an integrated circuit (IC) real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication chipset, a navigation and location component (e.g., global positioning system (GPS) transceiver), and/or a wireless modem, all of which are collectively represented at 44. Short-range communication (SRC) may be provided via a close-range wireless communication device 46 (e.g., a BLUETOOTH® unit), a dedicated short-range communications (DSRC) component 48, and/or a dual antenna 50. The above-described communications devices may provision data exchanges as part of a periodic broadcast in a vehicle-to-vehicle (V2V) communications system or a vehicle-to-everything (V2X) communications system. It should be understood that the vehicle 10 may be implemented without one or more of the above-listed components or, optionally, may include additional components and functionality as desired for a particular end use.

CPU 36 receives sensor data from one or more sensing devices that use, for example, photo detection, radar, laser, ultrasonic, optical, infrared, or other apposite technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as a variable-speed, multiphase motor/generator (M) unit 78, draw electrical power from and, optionally, deliver electrical power to one or more rechargeable battery units, such as traction battery pack 70. A high-voltage (HV) electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

During operation of the motor vehicle 10 of FIG. 1, the battery pack 70 may be housed inside a protective and electrically insulated battery enclosure that is sealed closed to prevent the unwanted intrusion of moisture, debris, and contaminant gases into the battery cells 74. Sealing of the battery pack enclosure may be achieved using an elongated and elastomeric seal structure that is compressed between an enclosure lid and a mating battery tray. To minimize total part count, reduce assembly time, and simplify sealing of the pack, the battery enclosure may employ a unitary polymer-composite battery tray that is integrally formed with a compressible elastomer seal. The elastomer seal may be embedded in a mating surface of the battery tray using resin transfer molding (RTM), precision injection molding (PIJ), vacuum infusion molding (VIM), or other suitable molding process. While illustrated and described below for use in a battery pack enclosure of an electric-drive automobile, it should be appreciated that disclosed concepts may be implemented for other enclosure configurations, implemented for innumerable types of vehicles, and may be implemented for automotive and non-automotive applications alike.

Figure 2:
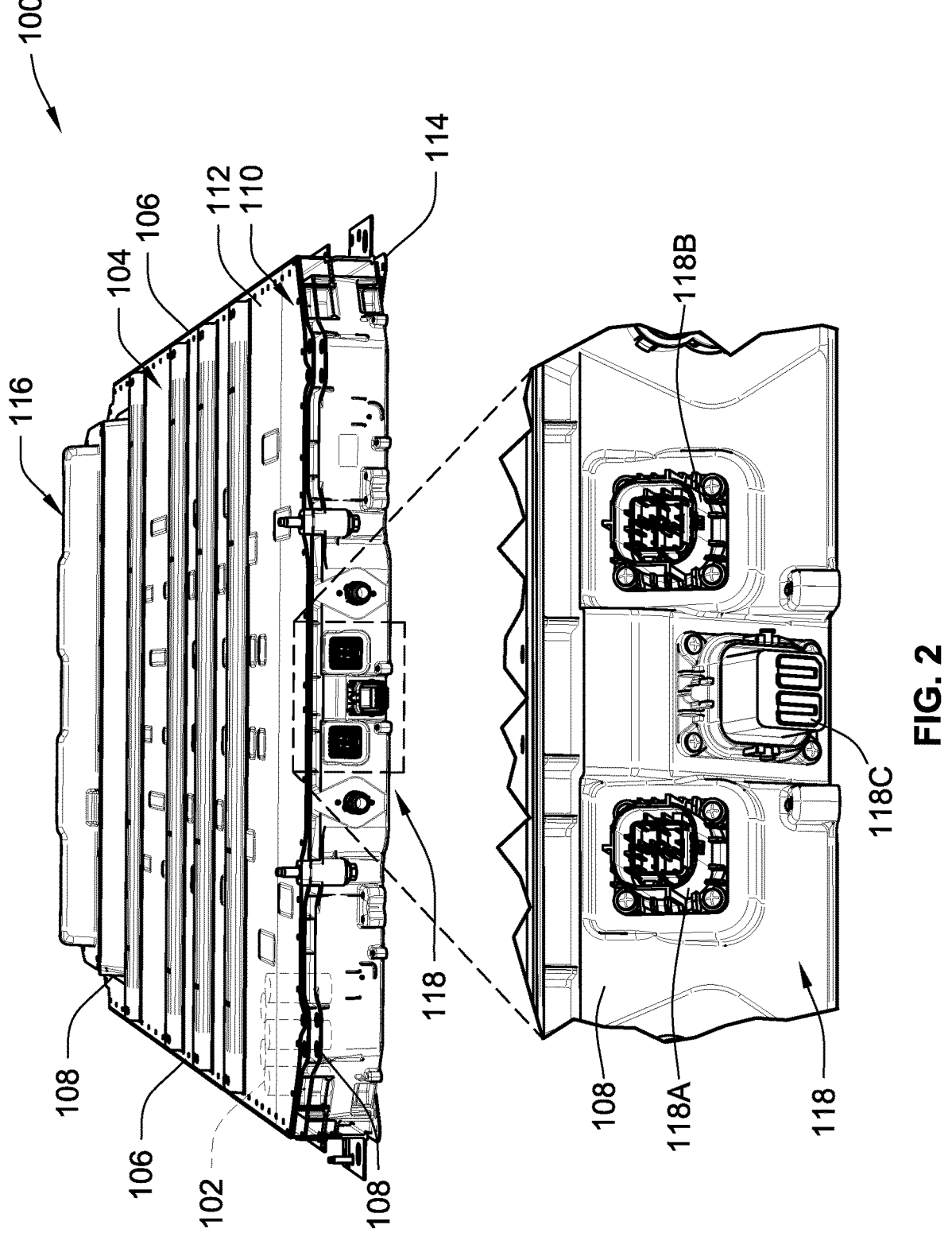
FIG. 2 is an elevated, perspective-view illustration of a representative traction battery pack with a set of leak-proof electric header assemblies in accordance with aspects of the present disclosure.

Turning next to FIG. 2, there is shown a segment of a rechargeable energy storage system in the form of a traction battery pack (also referred to herein as "battery unit") 100 that is adapted for storing and supplying high-voltage electrical energy used, for example, to propel an electric-drive vehicle, such as FEV automobile 10 of FIG. 1. This battery pack 100 may be representative of a deep-cycle, high-ampere capacity electric vehicle battery (EVB) that is rated for approximately 350 to 1000 direct current voltage (VDC) or more, for example, depending on a desired vehicle range, gross vehicle weight, and power ratings of the various accessory loads drawing electrical power from the RESS. To this end, the pack 100 may be electrically connectable to an electrical load or an electrical source, or both, such as polyphase permanent magnet (PM) electric machines or other form of electric traction motor (M) 78. Each traction battery pack incorporates an aggregation (e.g., 100's or 1000's) of discrete electrochemical cells connected in series and/or parallel to achieve the desired total voltage and total current requirements.

The traction battery pack 100 of FIG. 2 is generally typified by an assemblage of electrochemical battery cells that is contained inside a protective battery housing. In the illustrated example, a staggered cluster of lithium-class battery cells (some of which are shown hidden and designated generally as 102) is arranged in a rectangular array and securely mounted inside a battery pack housing 104. The housing 104 may be constructed of a metallic, polymeric, or fiber-reinforced polymer (FRP) material, including combinations thereof, to satisfy various mechanical, manufacturing, and thermal design specifications. The battery housing 104 may have a relatively flat and lightweight construction with a generally hexahedral shape, as shown, or may be constructed in other regular and irregular geometric configurations for accommodating application-specific design and packaging parameters. Likewise, the battery pack 100 may contain a cluster of staggered lithium-ion cylindrical can cells that share a common housing, as shown, or may contain stacks or individual modules of battery cells, may contain pouch-type cells, prismatic-type cells, or other cell form factor, and/or may employ other suitable battery technologies, such as those described above with respect to the battery cells 74 of FIG. 1.

According to the representative battery assembly configuration of FIG. 2, the battery pack housing 104 (also referred to herein as "unit housing") is generally composed of a rigid and load-bearing pack frame that cooperates with optional topside and bottom-side covers to collectively encase the battery cells 102. In particular, the pack housing 104 includes a pair of rocker section side rails 106 that are spaced laterally from each other and extend longitudinally along the length of the vehicle chassis. Opposing front and rear ends of the side rail 106 are joined, e.g., via threaded fasteners, to fore and aft bulkhead crossbeam rails 108, which are spaced longitudinally from each other and extend laterally across the width of the vehicle chassis. The two side rails 106 mount the battery pack 100 to rocker sections of a vehicle chassis, whereas the fore and aft bulkhead rails 108 mount the pack 100 to front and rear bulkhead sections of the vehicle chassis. Providing subjacent support for the battery cells 102 is a cell carrier tray 114, which may be interposed between an optional bottom shear plate and the bottom ends of the battery cells 102.

An integrated electrical interconnect board (ICB) assembly 110 is seated on top of the battery cells 102 of FIG. 2, interposed between a top (first) shear plate 112 and upper-most ends of the clustered battery cells 102. The integrated ICB assembly 110 may simultaneously function as an electrically insulating, cell holding, cell sensing, and cell bussing solution that electrically interconnects the battery cells 102 in series or in parallel. Optional ICB hardware may include a flexible integrated circuit (FIC) sensing package (not visible) with an assortment of battery operating sensors, such as voltage, current, and temperature sensing devices. A senseline assembly (not visible) with electrical pads and circuit traces operatively connects the FIC sensing package with select cells or cell groups of the battery pack 100. To provide fast-actuation current switching with resettable bidirectional short-circuit protection, a battery disconnect unit (BDU) 116 may be interposed between a pack-side DC-DC power converter (not shown) and the rechargeable battery pack 100 within the RESS.

To electrically connect the traction battery pack 100 to the vehicle's high-voltage electrical system, a set of leak-proof electric header assemblies 118 is provided on the forward bulkhead rail 108 of the pack housing 104 to provide a readily accessible interface for mating electrical connector plugs with the ICB assembly 110 and, thus, the battery cells 102. As shown, the set of electric header assemblies 118 incorporates an Auxiliary Power Module (APM) header assembly 118A, an Air Conditioning Electrical Compressor (ACEC) header assembly 118B, and a Front Power Inverter Module (FPIM) header assembly 118C. The APM header assembly 118A electrically couples the battery pack 100 to a resident DC-to-DC APM module (not shown), which scales down the high-voltage DC power output from the battery pack 100 to a regulated low-voltage rating (e.g., from 400V to 12V) for nominal system use. In contrast, the ACEC header assembly 118B electrically couples the battery pack 100 to a heat exchanger electric compressor (not shown) that provides refrigerant compression to the vehicle's in-cabin heating, ventilation, and air-conditioning (HVAC) system to support internal temperature regulation. The FPIM header assembly 118C electrically couples the battery pack 100 to a traction power inverter module (not shown), which converts HVDC bus voltage to AC power that is used to operate the multi-phase traction motors. For simplicity of design and maintenance, as well as for reduction in cost and assembly time, it may be desirable that the electric header assemblies 118 be substantially identical to one another. It is also envisioned that the battery pack 100 may include greater or fewer than the three header assemblies 118A-C illustrated in FIG. 2.

Figure 3:
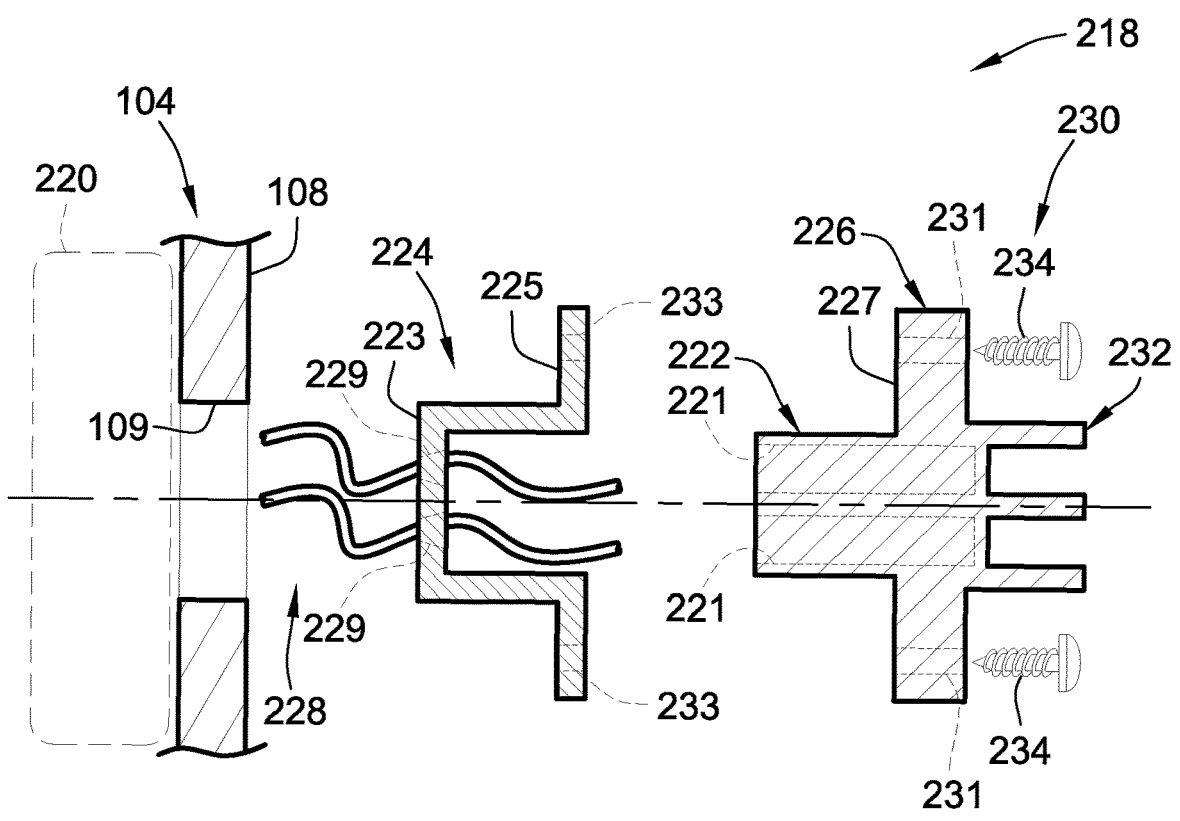
FIG. 3 is a schematic, side-view illustration of a representative electric header assembly with a one-piece header seal and a one-piece header and interconnect unit both externally mounted to the unit housing in accordance with aspects of the present disclosure.
Figure 4:
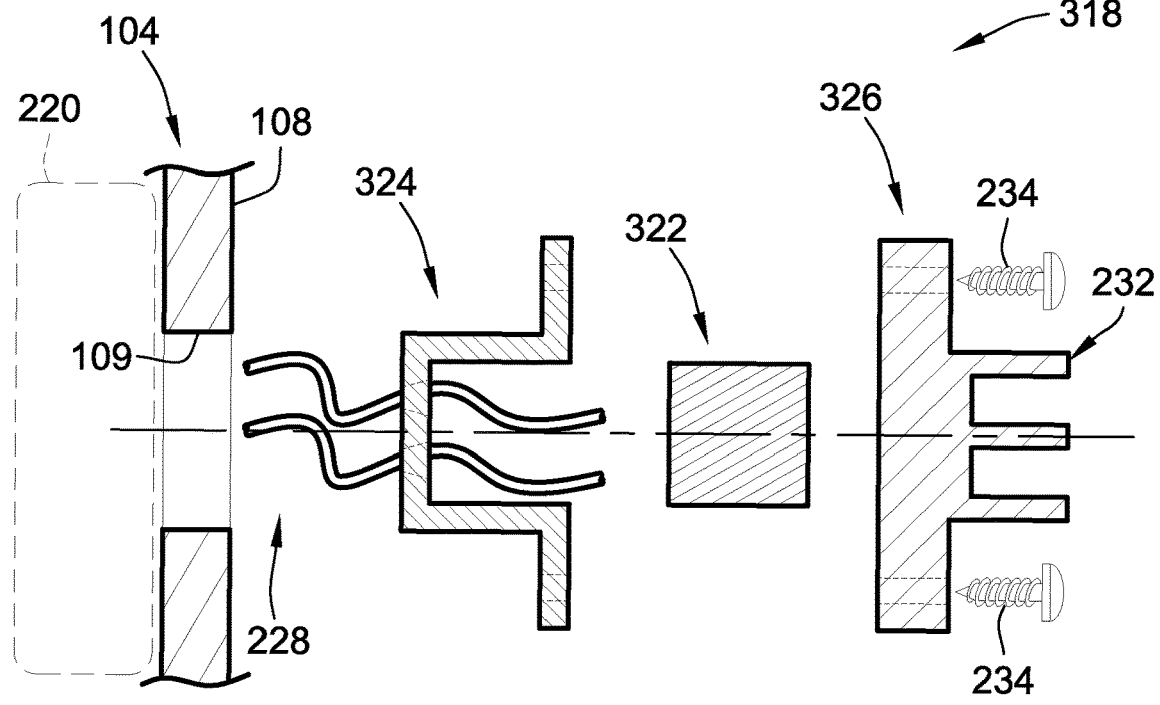
FIG. 4 is a schematic, side-view illustration of a representative electric header assembly with a one-piece header seal and two-piece header and interconnect all externally mounted to the unit housing in accordance with aspects of the present disclosure.

Once the header assemblies 118 are secured to the pack housing 104 and electrically mated with respective sets of HV terminal connectors electrically coupled to the ICB assembly 110, the battery cells, connectors, electronic components, etc., inside the pack housing 104 may be coated to a suitable depth by a potting material (shown schematically at 220 in FIGS. 3 and 4). As used herein, the term "potting" may be defined to include a process of injecting an electrical assembly with a viscous or gelatinous encapsulant compound that is designed to militate against shock and vibration while preventing the ingress of moisture and contaminants. The potting material 220 may take on a variety of different chemical compositions, including silicone-based compounds, epoxy-based resins, polymer foams and gels, ultraviolet (UV)-curable polyamides and polyurethanes, etc. As will be described in extensive detail below, each header assembly 118A-118C is provided with an optimized main header design that mates with a conformal and compressible sealing layer to help prevent inadvertent leakage of the potting material 220 from the battery pack 100 during injection thereof into the pack housing 104.

Figure 5:
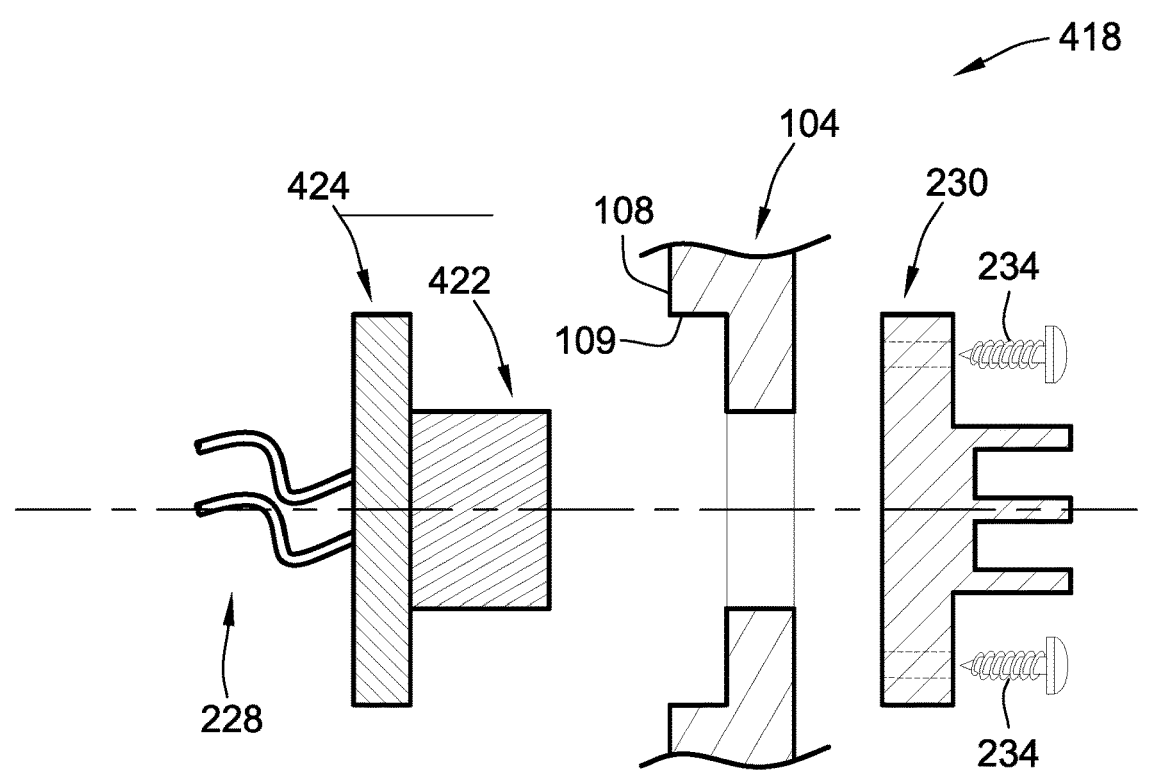
FIG. 5 is a schematic, side-view illustration of a representative electric header assembly with internally packaged header seal and interconnect terminal and externally mounted main header in accordance with aspects of the present disclosure.
Figure 6:
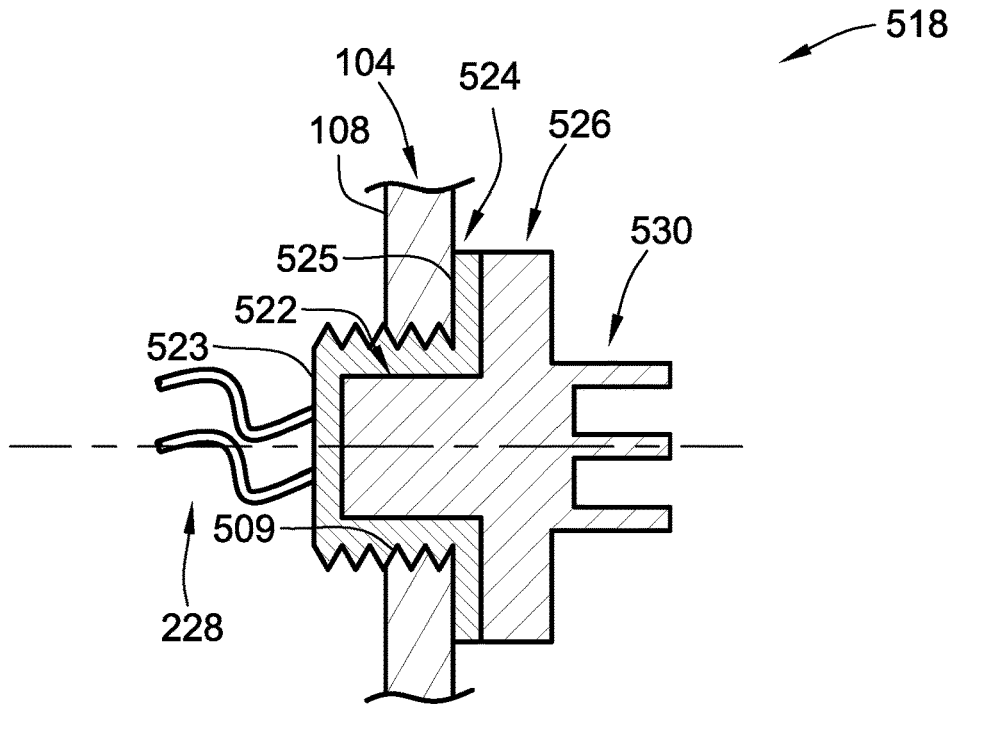
FIG. 6 is a schematic, side-view illustration of a representative electric header assembly with a one-piece header seal and a one-piece header and interconnect threadably mated with a complementary threaded slot in the unit housing in accordance with aspects of the present disclosure.

FIGS. 3-6 present representative examples of electric header assemblies 218, 318, 418 and 518, respectively, that are designed to help improve the ergonomics of the pack assembly process while also helping to prevent leakage of potting material from the header. It is envisioned that the electric header assemblies 218, 318, 418 and 518 of FIGS. 3-6 may be incorporated, singly or in any combination, into the battery pack 70 of FIG. 1 or the battery pack 100 of FIG. 2. And while differing in appearance, it is envisioned that any of the features and options described below with reference to the electric header assembly 218 of FIG. 3 may be implemented, singly or in any combination, into the header assemblies 318, 418 and 518 of FIGS. 4-6, and vice versa. As a non-limiting point of similarity amongst the illustrated header designs, each electric header assembly 218, 318, 418, 518 may be fabricated as a bipartite or tripartite unit that is generally composed of an interconnect terminal 222, 322, 422, 522, a header seal 224, 324, 424, 524, and a main header 226, 326, 426, 526. To help minimize part count while simplifying pack assembly, the electric header assemblies 218, 318, 418, 518 may lack an internal backing plate, fasteners, brackets, stakes, rivets, etc., that mount the interconnect, seal and/or header to an internal surface of the unit housing. To that end, it may be desirable that the entire electric header assembly 218, 318, 518 be securely mounted to the pack housing 104 from outside the housing 104, as shown in FIGS. 3, 4 and 6.

With reference to FIG. 3, the electric header assembly 218 is depicted as a bipartite construction with a one-piece header seal 224 and a one-piece header and interconnect (HIC) unit 230, both of which externally mount to an outboard-facing surface of the forward bulkhead rail 108 of the pack housing 104. When labelling a header assembly as bipartite, tripartite, quadripartite, etc., the core constituent components that define the assembly are not inclusive of ancillary parts and features that do not materially affect the basic and novel characteristics of the assembly (e.g., fasteners, adhesives, coatings, encapsulants, connecting wires, etc.). In the example of FIG. 3, the header assembly 218 may consist essentially of the seal 224 and the HIC unit 230, in which the interconnect terminal 222 and main header 226 are integrally formed as a single-piece structure from a rigid and electrically insulating polymer, such as polypropylene (PP) or polyvinyl chloride (PVC). The interconnect terminal 222 mechanically couples with a set of HV terminal rails, bars, or wires 228 (collectively "terminal connectors") to thereby operatively connect the electric header assembly 218 to the battery cells 102 inside of the pack housing 104. For at least some applications, the interconnect terminal 222 portion of the HIC unit 230 is an elongated rectangular-cylinder shaped body that contains a square array of wire channels 221. Each wire channel 221 receives therein and mechanically couples to a respective one of the terminal connectors 228. The wire-to-interconnect interface may be purely mechanical, with the end of each terminal wire bearing a female terminal (or male lead) that mechanically locks to the interconnect. The female terminal, in turn, receives therein, mechanically locks to, and thereby electrically connects with a complementary male lead (or female terminal) on the end of a load plug.

Header seal 224 of FIG. 3 is integrally formed as a single-piece structure from a compressible polymer, which may be in the nature of a water-impervious elastomer (e.g., EPDP rubber) or a closed-cell compressible foam (e.g., crosslinked polyethylene (PE) foam) that forms a fluid-tight interface between the HIC unit 230 and the pack frame's bulkhead rail 108. In particular, the header seal 224 mounts onto the interconnect terminal 222 portion of the HIC unit 230; when the electric header assembly 218 is mounted to the pack housing 104, the header seal 224 compresses against the exterior surface of the bulkhead rail 108 to thereby fluidly seal the interconnect 222 and header 226 to the housing 104. In FIG. 3, the header seal 224 is formed with a hollow, polyhedron-shaped seal hub 223 and a square-shaped seal flange 225 that projects transversely outward from the outer periphery of the seal hub 223. The seal hub 223 is sized and shaped to receive therein and substantially surround the interconnect terminal 222 portion of the HIC unit 230. Contrastingly, the seal flange 235 may be a substantially flat, toroidal structure that sits flush against and covers a pack-facing rear surface of a header flange 227 of the main header 226. To facilitate feedthrough of the terminal wires 228 into the interconnect terminal 222, the seal hub 223 portion of the header seal 224 may include a set of tapered slots 229, each of which receives therethrough a respective HV terminal wire 228.

To electrically connect the traction battery pack 100 to an external load, the main header 226 portion of the HIC unit 230 is fabricated with a connector port, such as a snap-lock square plug port 232, that mechanically couples with a complementary connector plug (not shown) to thereby electrically connect the HV terminal wires 228 inside the interconnect terminal 222 to the desired electric load. Main header 226 of FIG. 3 may be formed from the same insulating polymer as the interconnect terminal 222, e.g., in a single-shot injection molding process, or may be formed from a distinct polymeric material, e.g., in a two-shot injection molding process or separately formed and then joined using ultrasonic or laser welding. By mating the interconnect terminal 222 and main header 226 with the header seal 224, and securely mounting the header 226 and seal 224 to the rail 108, the electric header assembly 218 helps to prevent inadvertent leakage of the potting material 220 out of the pack housing 104 through the assembly 218.

In order to secure the electric header assembly 218 to the pack housing 104, the main header 226 includes a set of header fastener holes 231, which may be arranged in a square array at the corners of the header flange 227 of the main header 226. Each fastener hole 231 receives therethrough a respective fastener, such as self-aligning screw 234, to thereby mount the HIC unit 230 onto the outboard-facing surface of the bulkhead rail 108 of the pack housing 104. To this end, the header seal 224 includes a set of seal fastener holes 233, which may also be arranged in a square array at the corners of the seal flange 225 of the header seal 224. Each seal fastener hole 233 aligns with a respective header fastener hole 231 and concomitantly receives therethrough a respective fastener 234 to thereby mount the header seal 224 onto the bulkhead rail 108 of the pack housing 104. Once properly mounted, the header seal 224 compresses between pack-facing rear surface of the header flange 227 and the external surface of the pack housing 104. At the same time, the interconnect terminal 222 projects substantially orthogonally from the rear face of the main header 226, seats within the seal hub 223, and extends through a complementary shaped and sized hole 109 in the rail 108 of the pack housing 104.

With reference to FIG. 4, the electric header assembly 318 is depicted as a tripartite construction with a one-piece interconnect terminal 322, a one-piece header seal 324, and a one-piece main header 326, all of which externally mount to an outboard-facing surface of the forward bulkhead rail 108 of the pack housing 104, e.g., via fasteners 234. Generally speaking, the header assembly 318 of FIG. 4 may be substantially identical to the header assembly 218 of FIG. 3 except that the former employs an interconnect 322 that is manufactured separated from, then subsequently joined to, the header 326. Similar to the header seal 224 of FIG. 3, for example, the header seal 324 of the electric header assembly 318 of FIG. 4 mounts, e.g., via overmolding, heat staking, adhesives, fasteners, or friction-fit "sleeving", onto the outer periphery of the interconnect terminal 322. As another non-limiting point of similarity, the HV terminal wires 228 may be overmolded with or passed through the header seal 324 and into the interconnect terminal 322.

In contrast to the header assembly 218 of FIG. 3, the interconnect terminal 322 of FIG. 4 may be mechanically coupled to the main header 326 by sliding the terminal 322 into the header 326 using guiding features in the header 326 to align a proximal end of the terminal 322 with snap features that snap-fit the terminal 322 to the header 326. Alternatively, the interconnect terminal 322 may be mechanically coupled to the main header 326 using threaded fasteners, rivets, high-strength structural adhesives, or combinations thereof. The interconnect terminal 322, header seal 324, and main header 326, once assembled, may be aligned with a complementary header hole 109 in the bulkhead crossbeam rail 108; the interconnect 322 and seal 324 are then pushed through the header hole 109 and into the pack housing 104. The electric header assembly 318 is then rigidly secured via fasteners 234 to the outside of the pack housing 104 (also referred as "RESS casting").

Turning next to FIG. 5, the representative electric header assembly 418 is depicted as a tripartite construction with the interconnect terminal 422 and the header seal 424 located inside the pack housing 104, and the main header 426 mounted onto the external surface of the bulkhead cross-beam rail 108. In this example, the header seal 424 is integrally formed as a substantially flat, single-piece plate that closes off one end of the interconnect terminal 422 and, at the same time, projects outward from the outer periphery of the interconnect 422. The header seal 424 and a portion of the interconnect terminal 422 seat inside a recessed pocket 409 in a wall of the unit housing. The header seal 424 (or "sealing layer") may be overmolded, pressed, fastened, heat-staked, and/or adhered to the interconnect 422. Proximal ends of the HV terminal wires 228 may be fed through the seal 424 and into the interconnect 422 to mechanically couple therewith. Threaded fasteners 234 fasten the main header 426 and, thus, the entire header assembly 418 to the external surface of the rail 108. The interconnect terminal 422 of FIG. 5 may be operatively attached to the main header 426 in any of the manners described above, for example, with respect to the interconnect 322 and header 326 of FIG. 4.

The electric header assembly 518 of FIG. 6 is shown with a one-piece header seal 524 and a one-piece header and interconnect (HIC) unit 530 that threadably mate with a complementary threaded slot 509 in the pack housing 108. In particular, the header seal 524 is integrally formed as a single-piece structure with a cylindrical seal hub 523 and a substantially flat seal flange 525 projecting transversely outward from the seal hub 523. In this instance, the seal flange 525 sits substantially flush against and covers a rear face of the main header 526 portion of the HIC unit 530. The seal hub 523 is fabricated with external helical threads that threadably mate with complementary internal helical threads of the seal slot 509 in the forward bulkhead rail 108 of the pack housing 104. In this example, the interconnect terminal 522 may be a formed as a separate part that is then attached, e.g., using adhesive, fasteners, snap-fit connection, etc., to the main header 526. For simplicity of design and ease of assembly, the interconnect terminal 522 may be molded directly with the main header 526 as a single piece, e.g., via single-shot or two-shot molding. The header seal 522 may be overmolded, sleeved, fastened, heat staked, adhered, etc., onto the HIC unit 530. One end of each of the HV terminal wires 228 is directly connected to main header 526.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric header assembly for a battery unit, the battery unit having a unit housing with multiple battery cells secured in the unit housing, the electric header assembly comprising:

an interconnect terminal formed with a first insulating polymer and configured to couple with a set of terminal connectors electrically connected to the battery cells;

a header seal formed with a compressible polymer and mounted onto the interconnect terminal, the header seal configured to compress against the unit housing; and a main header formed with a second insulating polymer and attached to the interconnect terminal, the main header configured to couple with a connector plug to thereby electrically connect the terminal connectors coupled with the interconnect terminal to an external load, the main header configured to mount to an external surface of the unit housing.

2. The electric header assembly of claim 1, wherein the main header includes multiple header fastener holes each configured to receive therethrough a respective fastener to thereby mount the main header onto the external surface of the unit housing.

3. The electric header assembly of claim 2, wherein the header seal includes multiple seal fastener holes each aligned with a respective one of the header fastener holes and configured to receive therethrough the respective fastener of the respective one of the header fastener holes to thereby mount the header seal onto the external surface of the unit housing.

4. The electric header assembly of claim 3, wherein the header seal compresses between a rear face of the main header and the external surface of the unit housing, and the interconnect terminal projects from the rear face of the main header, seats within the header seal, and extends through a hole in the unit housing.

5. The electric header assembly of claim 1, wherein the header seal is integrally formed as a single-piece structure with a seal hub and a seal flange projecting transversely outward from the seal hub.

6. The electric header assembly of claim 5, wherein the seal hub receives therein and surrounds the interconnect terminal, and wherein the seal flange sits flush against and covers a rear face of the main header.

7. The electric header assembly of claim 1, wherein the header seal is integrally formed as a single-piece seal plate closing one end of the interconnect terminal, the seal plate projecting from an outer periphery of the interconnect terminal and seating within a recessed pocket in a wall of the unit housing.

8. The electric header assembly of claim 1, wherein the header seal is integrally formed as a single-piece structure with a seal hub and a seal flange projecting transversely outward from the seal hub, the seal flange sitting against and covering a rear face of the main header, and the seal hub including external threads configured to threadably mate with internal threads of a seal slot in a wall of the unit housing.

9. The electric header assembly of claim 1, wherein the terminal connectors include high-voltage (HV) terminal wires, and the header seal includes a set of tapered slots each configured to receive therethrough a respective one of the HV terminal wires.

10. The electric header assembly of claim 1, characterized by a lack of a backing plate and internal fasteners cooperatively mounting the interconnect terminal and the header seal to an internal surface of the unit housing.

11. The electric header assembly of claim 1, wherein the interconnect terminal includes an elongated cylindrical body containing a plurality of channels each configured to receive therein and couple to a respective one of the terminal connectors.

12. The electric header assembly of claim 1, wherein the header seal is formed as a single-piece structure from the compressible polymer, the compressible polymer is a watertight elastomer or a closed-cell compressible foam, and the header seal fluidly seals the electric header assembly to the unit housing.

13. The electric header assembly of claim 1, wherein the first and second insulating polymers are the same, and wherein the interconnect terminal is integrally formed with the main header as a single-piece structure.

14. A motor vehicle, comprising:

a vehicle body;

a plurality of road wheels attached to the vehicle body;

a traction motor attached to the vehicle body and configured to drive one or more of the road wheels to thereby propel the motor vehicle; and a traction battery pack attached to the vehicle body and configured to power the traction motor, the traction battery pack including a pack housing, a plurality of rechargeable battery cells secured inside the pack housing, a potting material injected into the pack housing, and an electric header assembly operatively connecting the traction battery pack to the traction motor, the electric header assembly including:

an interconnect terminal formed with a first insulating polymer and mechanically coupled with a set of high-voltage (HV) terminal wires electrically connected to the rechargeable battery cells;

a header seal formed with a compressible polymer and mounted onto the interconnect terminal, the header seal compressed against the pack housing; and a main header formed with a second insulating polymer and attached to the interconnect terminal, the main header mechanically coupled with a connector plug electrically connected to the traction motor such that the connector plug electrically connects with the HV terminal wires coupled with the interconnect terminal, the main header mounted to an external surface of the pack housing and preventing leakage of the potting material from the pack housing.

15. A method of manufacturing an electric header assembly for a battery unit having a unit housing with multiple battery cells secured in the unit housing, the method comprising:

forming, with a first insulating polymer, an interconnect terminal configured to couple with a set of terminal connectors electrically connected to the battery cells;

forming, with a compressible polymer, a header seal configured to compress against the unit housing;

forming, with a second insulating polymer, a main header configured to couple with a connector plug to thereby electrically connect the terminal connectors coupled with the interconnect terminal to an external load;

attaching the main header to the interconnect terminal;

mounting the header seal onto the interconnect terminal; and mounting the main header to an external surface of the unit housing.

16. The method of claim 15, wherein the main header is formed with multiple header fastener holes each configured to receive therethrough a respective fastener to thereby mount the main header onto the external surface of the unit housing.

17. The method of claim 16, wherein the header seal is formed with multiple seal fastener holes each aligned with a respective one of the header fastener holes and configured to receive therethrough the respective fastener of the respective one of the header fastener holes to thereby mount the header seal onto the external surface of the unit housing.

18. The method of claim 17, wherein the header seal compresses between a rear face of the main header and the external surface of the unit housing, and the interconnect terminal projects from the rear face of the main header, seats within the header seal, and extends through a hole in the unit housing.

19. The method of claim 15, wherein the header seal is integrally formed as a single-piece structure with a seal hub and a seal flange projecting transversely outward from the seal hub.

20. The method of claim 15, wherein the first and second insulating polymers are the same, and wherein the interconnect terminal is integrally formed with the main header as a single-piece structure.

* * * * *